United States Patent [19]

Firth

[11] Patent Number: 4,855,047

[45] Date of Patent: Aug. 8, 1989

[54] HIGH PRESSURE SPIN-ON FILTER

[75] Inventor: Robert L. Firth, Edina, Minn.

[73] Assignee: HR Textron, Inc., Valencia, Calif.

[21] Appl. No.: 28,853

[22] Filed: Mar. 23, 1987

[51] Int. Cl.$^4$ ............................................. B01D 27/08
[52] U.S. Cl. ..................................... 210/232; 210/440;
210/443; 210/453; 210/497.01; 210/DIG. 17;
55/495; 55/502
[58] Field of Search ................ 210/252, 435, 443, 444,
210/440, 441, 453, 497.01; 55/490, 495, 502

[56] References Cited

U.S. PATENT DOCUMENTS

| | | | |
|---|---|---|---|
| 3,460,676 | 8/1969 | Kaster | 210/494.1 |
| 4,237,015 | 12/1980 | Fearnhead | 210/D17 |
| 4,369,113 | 1/1983 | Stifelman | 210/440 |
| 4,575,422 | 3/1986 | Zimmer | 210/232 |

Primary Examiner—Richard V. Fisher
Assistant Examiner—Wanda L. Millard
Attorney, Agent, or Firm—Nilsson, Robbins, Dalgarn, Berliner, Carson & Wurst

[57] ABSTRACT

An improved spin-on, throw-away type fluid filter assembly which is capable of withstanding operational pressures in excess of 1000 psi adapted to by threadably affixed to a filter mounting means. The improved filter assembly includes a housing having a closed end and an open end which receives a base plate. The open end of the housing is folded inwardly over the base plate. A cap having a downwardly extending skirt is then press-fitted over the open end of the housing and extends substantially coexistent with the base plate and is then roll-formed so that the periphery of the skirt engages the exterior of the housing at the lower surface of the base plate to add strength to the structure.

1 Claim, 3 Drawing Sheets

HIGH PRESSURE SPIN-ON FILTER

BACKGROUND OF THE INVENTION

1. Field of the Invention

The present invention relates generally to filtration and more particularly to a fluid filter of the spin-on or throw-away type adapted to be screwed onto a filter mounting means and which is capable of withstanding operational pressures in excess of 1000 psi.

2. Description of the Prior Art

Spin-on or throw-away filters have become regularly accepted in those areas where liquid filtration at relatively low pressures (not exceeding 300 psi) are employed. As a result of this success, a demand has been created in industrial applications wherein surge pressures in excess of 1000 psi can occur. Various attempts have been made to construct spin-on type filters to meet the demands for such highpressure usage. One such attempt is disclosed in U.S. Pat. No. 3,859,216 which incorporates a rigid base plate which is held in position by a cover plate which is secured by a roll seam to the edge of the housing in which the filter is disposed. Another attempt at providing a filter for high-pressure operations is disclosed in U.S. Pat. No. 4,369,113 which also includes a base plate which seals the opening of the housing in which the filter element is disposed. The housing and base plate are secured together by folding the upper periphery of the housing over the top of the base plate and then back upon itself to thus form a folded connection between the base plate and the housing.

Although the filters of the prior art have proven satisfactory under certain limited conditions, it has been found that the housing may deform, allowing leakage around the seals, particularly at high or pulsating high pressure, or alternatively, the folds provided in the housing to accomplish a seal with the base plate may unfold, creating a failure in the filter.

SUMMARY OF THE INVENTION

A spin-on filter, including a generally cylindrical housing having an open end, a closed end and a filter element operatively disposed therein. A rigid base plate is disposed in the open end of the housing and is secured to the housing by folding the open end of the housing inwardly over the upper surface of the base plate. A cap means is then fitted over the inwardly folded portion of the housing. The cap means includes a skirt extending downwardly along the housing to secure the housing in place on the base plate at pressures in excess of 1000 psi.

DETAILED DESCRIPTION

Figure 1:
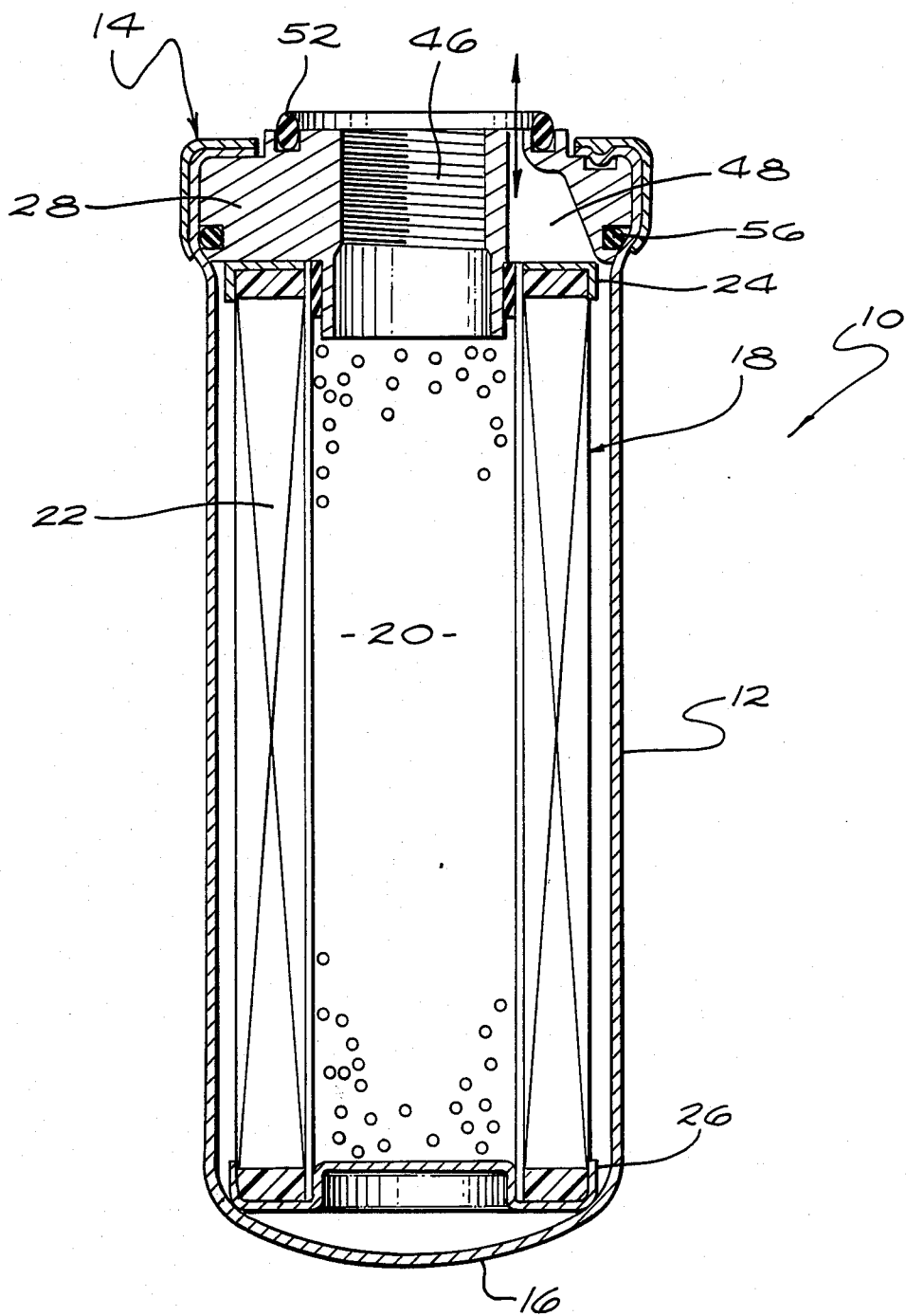
FIG. 1 is a cross-sectional elevational view of one form of a spin-on, throw-away fluid filter incorporating the principles of the present invention.
Figure 2:
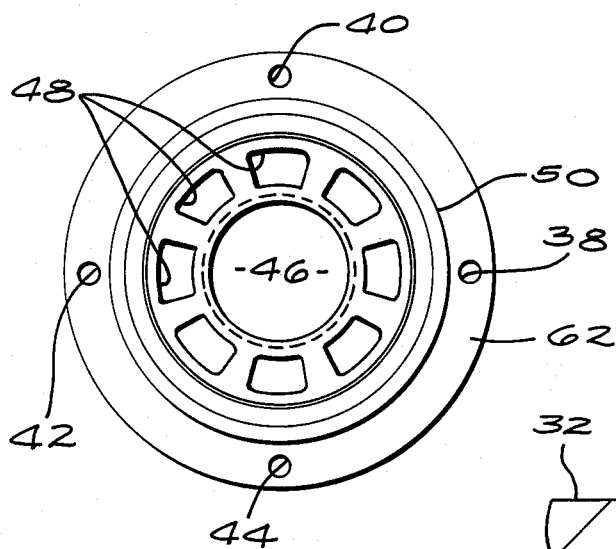
FIG. 2 is a top plan view of the base plate of the type illustrated in FIG. 1.

Referring now to the drawings and more particularly to FIGS. 1 and 2, there is shown a spinon fluid filter 10 constructed in accordance with the principles of the present invention. Filter 10 is particularly adapted for use in systems which require filtration of oil at elevated pressures in excess of 1000 psi. As will be explained more fully in detail below, the filter assembly of the present invention includes a housing which is clamped or bent over the upper surface of a base plate through which the oil to be filtered flows and in particular includes a cap which is fitted over the inwardly bent portion of the housing to add substantial additional strength at the open end of the housing. The filter, constructed in accordance with the present invention, may be utilized as an isolated post-type of filter as is generally illustrated and described in U.S. Pat. No. 3,859,216 or a filter with a base plate having a central opening surrounded by a plurality of openings of the type generally illustrated and described in U.S. Pat. No. 4,369,113. The general construction of the isolated post and central opening attachment disclosed in U.S. Pat. Nos. 3,859,216 and 4,369,113 is incorporated herein by reference. For purposes of ease and clarity of illustration, only the construction generally shown in U.S. Pat. No. 4,369,113, insofar as the filter element and flow path through the base plate, are illustrated and described herein.

The filter 10 includes a generally cylindrical filter housing 12 having an open top end 14 and a closed bottom end 16. Generally, the housing 12 is of thin walled construction and typically may be formed by stamping or drawing metallic material such as sheet steel or the like.

A filter element assembly 18 is disposed internally of the housing 12 and includes a perforated cylindrical core 20 surrounded by a filter element 22 both of which are supported by a pair of end caps 24 and 26. The lower end cap 26 extends across and closes the bottom end of the perforated core 20 while the top end cap 24 includes a central opening which receives and surrounds a portion of the base plate 28 secured across the open end 14 of the housing 12. The filter element 22 is typically secured in place between the end caps 24 and 26 by an epoxy or other sealing compound as is well known in the art.

As previously indicated, the base plate 28 which seals the open end of the housing may be constructed as a base plate of uniform cross section with a single concentric opening through which both inlet and outlet fluid passages extend, such passages being defined by a filter head or similar mounting means, or alternatively as shown in FIG. 1 the base plate 28 may define a central opening 46 with a plurality of radially disposed openings 48 thereabout to provide the inlet and outlet fluid flow passages. In any event the base plate 28 includes a body 30 having an upper face 32 spaced from a lower face 34, which faces are interconnected by a sidewall 36 extending therebetween. The upper face 32 defines a plurality of depressions 38 through 44 therein, the purpose of which will be described more fully hereinafter.

A central opening 46 is provided in the base plate through which fluid may flow, either inlet or outlet. The central opening 46 is surrounded by a plurality of openings 48 through which fluid may flow, either inlet or outlet, as desired in accordance with any particular application. A continuous groove 50 is defined in the upper surface 32 for receiving an O-ring 52 to seal the filter element against a filter mounting means such as a filter head or the like (not shown) as is well known in the prior art. The sidewall 36 of the base plate 28 also defines a continuous recess 54 for receiving an O-ring 56 to seal the base plate 28 to the interior surface of the housing 12 to prevent fluid leakage.

Figure 3:
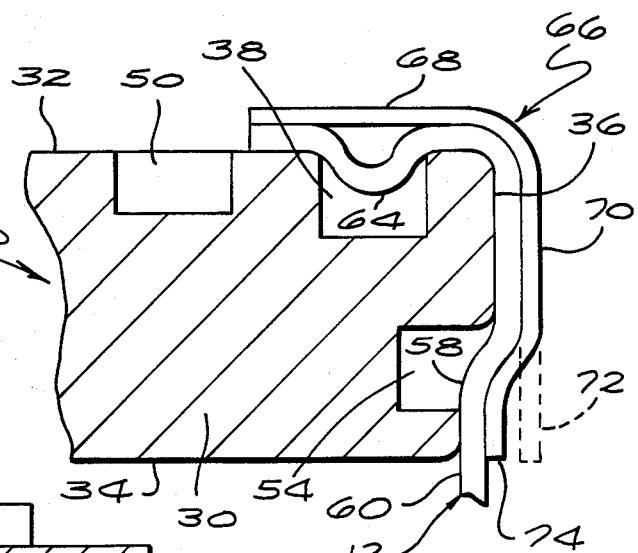
FIG. 3 is a fragmentary cross-sectional view illustrating the manner in which the housing, base plate and cap cooperate.

As is shown more specifically in FIG. 3, the upper surface 32 of the base plate 28 has a greater diameter than does the lower surface 34. It is also quite apparent from FIG. 3 that the housing 12 has a smaller diameter below the surface 34 of the base plate 28 than does the upper, more opened end 14 thereof. By the differential in the diameters of the housing 12 a shoulder area 58 is formed on the internal surface 60 of the housing 12. During assembly, the base plate 28 is press-fitted through the upper, open end of the housing 12 until it engages the shoulder 58 to thereby properly position the base plate 28 within the housing 12. The O-ring 56 has been omitted for clarity of illustration.

After the base plate 28 is press-fitted into the open, upper end 14 of the housing 12, the upwardly extending portion of the housing is then folded inwardly over the periphery of the base plate so that it overlies the outer area 62 thereof. The inwardly folded portion of the housing overlying the area 62 is then deformed so as to protrude into the recesses 38 through 44 as more specifically shown at 64 (FIG. 3). By forcing the inwardly folded portion of the housing which overlies the depressions 38 through 44 thereinto locks the housing to the base plate so that rotation of the housing to attach or detach the filter from an appropriate mounting means will cause both the base plate and the housing to turn simultaneously. Without such an interference between the housing 12 and the base plate 28, the housing 12 may move relative to the base plate 28 thus rendering the filter non-removable from the filter mounting means.

Subsequent to folding the upper portion of the housing 12 inwardly as above described, a cap means 66 is press-fitted over that part of the end portion 14 of the housing 12 which has been inwardly folded as above described. The cap means 66 includes an inwardly folded generally in the shape of an annulus, having inner and outer edges, which overlies the inwardly folded upper portion of the housing 12. The cap means also includes a skirt 70 which extends downwardly outer edge of the inwardly folded portion 68 (annulus) for a distance which is less than the length of the housing. Preferably the skirt 70 is coextensive with the sidewall 36 of the base plate 28. Upon being initially press-fitted over the upper portion of the housing 12, the skirt extends as shown in dashed lines at 72 in a downward direction with a space between the inner surface thereof and the outer surface of the housing 12. The lower portion 72 of the skirt 70 is then roll-formed to the position as shown at 74 so as to conform to the smaller diameter portion of the housing 12 and the base plate 28. By being thus roll-formed, additional strength is provided to the housing thereby enabling it to withstand high and pulsating pressures in excess of 1000 psi without degradation of performance.

Figure 4:
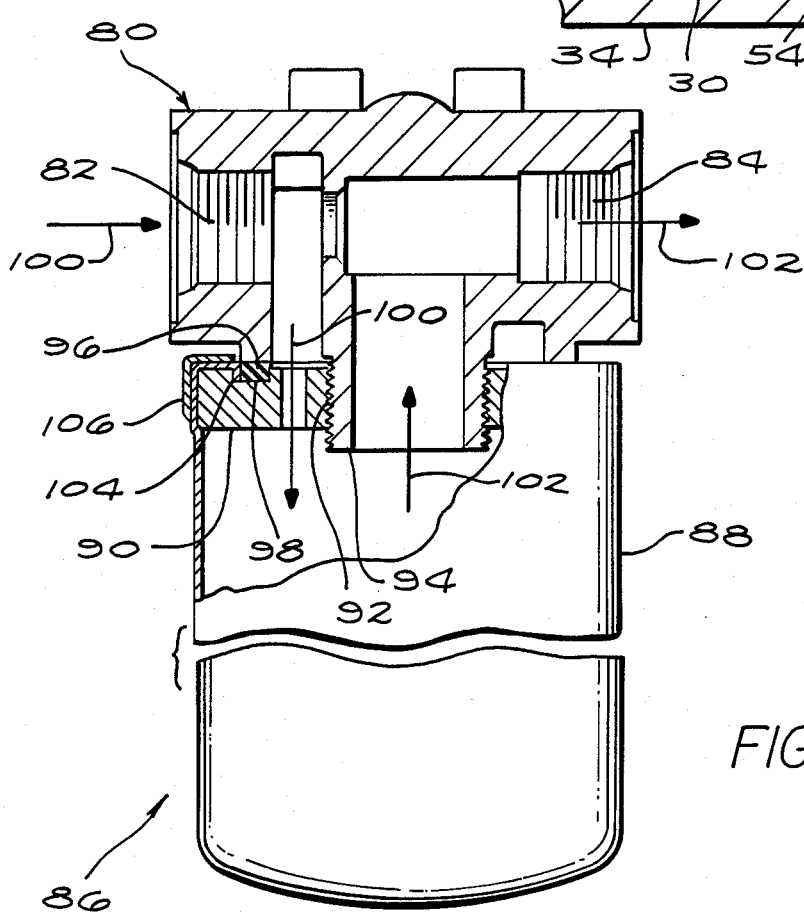
FIG. 4 is a partial cross-sectional view of an alternative embodiment of a filter constructed in accordance with the present invention, attached to a filter head.

Referring now more particularly to FIG. 4, an alternative embodiment of a filter constructed in accordance with the present invention is illustrated. As is therein shown, a filter head 80 defines inlet port 82 and outlet port 84. A filter 86 including a housing 88 attached to a base plate 90 in a manner similar to that above described is attached to the filter head 80. The attachment is accomplished through a threaded opening 92 which is threadably secured to a downwardly extending member 94 of the filter head 80. An O-ring 96 is seated within an opening 98 on the upper surface of the base plate 90 for engagement with the filter head to seal the filter thereto to enable the flow of fluid as shown by the arrows 100 inwardly into the filter and by the arrows 102 outwardly after being filtered.

As can be seen from FIG. 4, the upper periphery of the housing 88 is turned inwardly over the top of the base plate 90 as above described and then downwardly as shown at 104 into the groove 98 which receives the O-ring 96. Thereafter, the cap means 106 is press-fitted into place as above described. Obviously, though not shown in FIG. 4, the downwardly depending skirt of the cap means 106 may be coextensive with the base plate 90 and also may be rolled inwardly and deformed to the smaller diameter of the housing 88 as above described.

Figure 5:
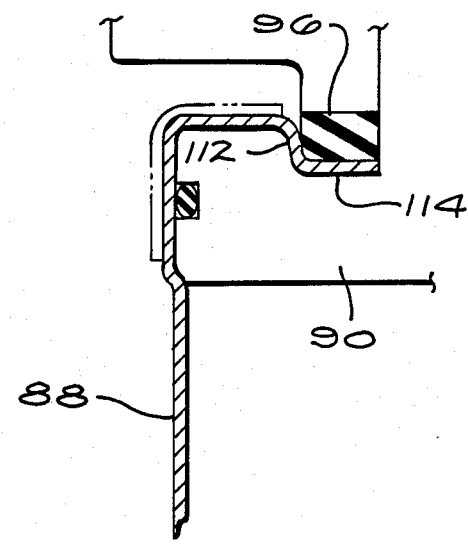
FIG. 5 is a fragmentary cross-sectional view illustrating another alternative embodiment of the structure as shown in FIG. 4.

As shown in FIG. 5, the upper periphery of the housing 88 may be turned inwardly over the periphery of the base plate 90, then downwardly as shown at 112 and then inwardly again as shown at 114 to provide a seat for the O-ring 96.

Figure 6:
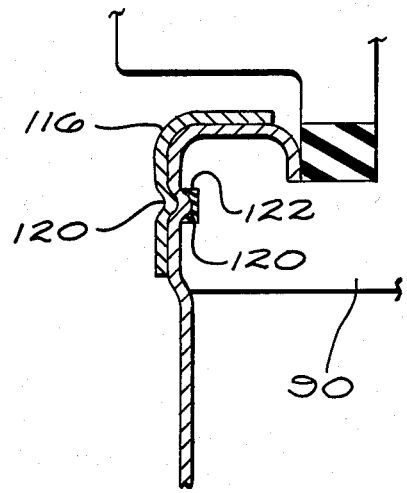
FIG. 6 is a fragmentary cross-sectional view illustrating a modification of the structure as illustrated in FIG. 4.

In FIG. 6, there is shown a structure similar to that shown in FIG. 4 but wherein both the press-fitted cap 116 and the housing 118 have been deformed, as shown at 120 for the purpose of providing an additional seal for the O-ring 120 seated within a continuous groove 122 in the sidewall of the base plate 90. The deformation as shown at 120 also provides additional strength to the structure, allowing it to better withstand the high pressures for which the filter is designed.

Figure 7:
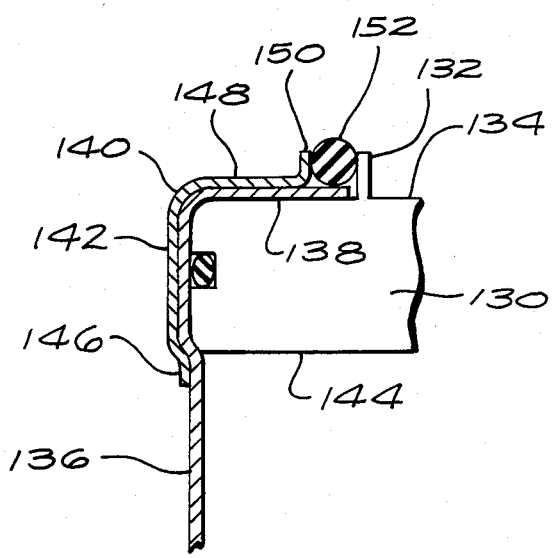
FIG. 7 is a fragmentary cross-sectional view of yet another different embodiment of the structure illustrated in FIG. 4.

In FIG. 7, yet a further alternative embodiment is illustrated, in which the base plate 130 includes an upstanding ridge 132 on the upper surface 134 thereof. The housing 136 is bent inwardly at its upper, open end as shown at 138 and as above described. A press-fitted cap means 140 includes a skirt 142 which extends downwardly beyond the lower surface 144 of the base plate and is then rolled or deformed inwardly as shown at 146 for the purposes as above described. In addition, the inwardly directed upper portion 148 of the cap means 140 is turned upwardly at its periphery as shown at 150 to provide a continuous groove between it and the upstanding continuous ridge 132 to provide a groove for receiving the O-ring 152 to seal the filter against the filter head (not shown).

What is claimed is:

1. A spin-on filter comprising:
a generally cylindrical housing having an open end, a closed end and a filter element operatively disposed therein, said open end of said housing including a reentrant portion having a diameter greater than the remainder of said housing and defining a shoulder region displaced from said open end;
a rigid base plate press fitted into the open end of said housing and seated against said shoulder and being secured thereto by said housing being folded inwardly over the periphery of said base plate, said base plate including upper and lower spaced-apart faces interconnected by a sidewall, the lower face of said base plate having a smaller diameter than the upper face thereof, said upper face defining a plurality of spaced-apart depressions therein, the inwardly folded portion of said housing having the overlying sections thereof extending into said depressions to prevent rotation of said housing relative to said base plate; and cap means fitted over said inwardly folded portion of said housing and including a skirt extending downwardly along said housing for a distance less than the length of said housing but at least co-extensive with said base plate side wall and secured in place by being bent inwardly about its terminus to conform to the smaller diameter of said housing and said lower face to retain said housing on said base plate at pressures in excess of 1000 psi.

* * * * *